Feb. 28, 1967 G. MAXON, JR., ETAL 3,306,597
FLAME CUTTING MACHINE
Filed Aug. 2, 1963 6 Sheets-Sheet 3

Fig. 8.

3,306,597
FLAME CUTTING MACHINE
Glenway Maxon, Jr., 1943 N. Summit Ave., Milwaukee, Wis. 53202, and William H. B. Wright III, 4777 Marlborough Drive, Whitefish Bay, Wis. 53217
Filed Aug. 2, 1963, Ser. No. 299,531
11 Claims. (Cl. 266—23)

This invention relates generally to automatically operable flame cutting apparatus and has more particular reference to improvements in flame cutting machines that are especially adapted for the machining of gears, sprockets, and other toothed objects.

The machine of this invention is similar in some respects to that disclosed in Patent No. 2,583,002, issued to Glenway Maxon, Jr., on January 22, 1952. Like the machine of said patent, it also comprises a carriage that is translated fore and aft along the top of a supporting structure or frame to carry a cutting torch mounted on the front of the carriage back and forth across a moving work piece being cut by the flame of the torch. The work piece is usually mounted upon a spindle that turns slowly while the carriage is moved fore and aft, while gear or sprocket teeth are being flame cut therein; but if the work piece is translated in one direction crosswise of the motion of the torch carriage, teeth can be flame cut in a bar-like blank to form a rack.

Reciprocation of the carriage is effected by means of a cam follower connected with the carriage and engaged with the surface of a power driven contour cam which is rotated in synchronization with the spindle carrying the work piece or blank. This cam is so shaped as to effect cutting of one tooth in the blank in consequence of one complete revolution of the cam, and so that equispaced teeth are cut in the work piece during continued rotation of the cam and spindle.

In general, it is an object of this invention to provide a flame cutting machine of improved construction, featuring simpler components that can be manufactured at low cost, which are easier to assemble, and which assure accurate and more dependable performance of the machine with a minimum of attention.

More specifically, this invention has as one of its objects to provide a flame cutting machine in which the cam and spindle driving instrumentalities are so combined with other components of the machine as to eliminate costly machining operations on the main frame or supporting structure of the machine.

Another object of the invention is to incorporate in a flame cutting machine of the character described a simple but efficient feed-in mechanism by which the torch carriage can be moved manually either forwardly or rearwardly relative to the contour cam by which the carriage is driven, to enable the torch to cut through edge portions of a work piece to the desired cutting zone before automatic operation of the machine is commenced.

A further object of this invention is to provide an automatic flame cutting machine of the character described wherein the carriage mounting and guiding means and also the cam for driving the carriage are located above and as far as possible from the torch tip and the zone where flame cutting takes place, and are therefore protected against being fouled by spattering metal during flame cutting.

Still another object of this invention resides in the provision of a flame cutting machine of the character described wherein rotation of a power driven contour cam can be translated into reciprocatory movement of a torch carrying carriage either through a cam follower substantially directly connected between the cam and the carriage, or through a pantograph accessory that is readily attachable to the machine to facilitate changing the sizes of teeth to be cut in a blank by the torch.

With the above and other objects in view which will appear as the description proceeds, this invention resides in the novel construction, combination and arrangement of parts substantially as hereinafter described and more particularly defined by the appended claims, it being understood that such changes in the precise embodiments of the herein disclosed invention may be made as come within the scope of the claims.

The accompanying drawings illustrate two complete examples of the physical embodiments of the invention constructed according to the best modes so far devised for the practical application of the principles thereof, and in which.

Referring now more particularly to the accompanying drawings, in which like reference characters identify like parts, the numeral 10 generally designates an elongated substantially flat carriage that is movable horizontally lengthwise fore and aft to carry a cutting torch 11, mounted on its front end portion, back and forth across an edge portion of a work piece or blank 12 to be cut by the flame of the torch. The carriage 10 is mounted upon a main frame or supporting structure 13, which defines an enclosure having upright sides comprising pairs of opposite side and end walls 14 and 15, respectively, and a horizontal top wall 16. At its front, the top of the main frame is extended forwardly, as at 17, a distance beyond the adjacent end wall 15.

The carriage may take the form of a substantially flat plate that is constrained to fore and aft reciprocatory motion along the top of the main frame, over an elongated rectangular mounting plate 18 that provides a substantial portion of the top of the frame. The mounting plate 18 fits in a correspondingly shaped rectangular opening 19 in the top of the frame, and has its opposite longitudinal edge portions supported on rails 20 that are secured to the underside of the top wall 16. Cap screws 21 extending upwardly through suitable holes in the rails thread into the mounting plate from its underside to hold the plate in position on the frame, with its top surface horizontal and flush with the top wall portions of the frame surrounding it.

Bars secured to the top of the mounting plate and parallel to the length of the carriage provide tracks that cooperate with rollers on the carriage to guide the latter for translatory motion lengthwise of the carriage. Two such tracks 23 are located at the front of the frame, directly adjacent to the opposite side edges of the carriage, and the remaining track 24 is located at the rear of the carriage, on its longitudinal centerline. Rollers 25 mounted on the carriage to rotate about hroizontal axes transversely of the carriage, engage the tops of the tracks 23 and 24 and thus provide a stable three point support for the carriage that holds it spaced above the top of the mounting plate 18.

Pairs of edge rollers 26 mounted on the underside of the carriage at its front and rear end portions rotate on vertical axes and cooperate with the tracks 23 and 24 to constrain the carriage to back and forth motion along a straight path. The two rollers 26 at the rear of the carriage engage the opposite sides of the rear track 24, while each of the front rollers 26 is mounted alongside one of the rollers 25, and engages the inner surface of the adjacent track 23.

The top of the carriage is recessed to provide an elongated slideway 28 extending fore and aft of the carriage along the central portion thereof. This slideway opens to the front end of the carriage, extends back for about two-thirds of its length, and has parallel opposite side edges 29 and a flat bottom 30 that lies in a plane parallel to but beneath the top of the carriage.

The cutting torch 11 is carried by a bracket 32 that is mounted on a slide 33 which is received in the slideway 28 and can be projected a substantial distance forwardly beyond the front of the main frame. The slide is thus guided by the slideway 28 for fore and aft motion relative to the carriage 10, so that it can be moved lengthwise of the carriage to effect a quick adjustment of the position of the cutting torch relative to the carriage. A pair of thumb screws 34 passing downwardly through the slide 33 and a lengthwise extending slot 35 in the bottom 30 of the slideway, thread into a transverse cleat 36 spanning the slot at the underside of the carriage to thus provide means for releasably holding the slide 33 in any adjusted position along the length of the slideway. Fine adjustment of the torch bracket lengthwise of the carriage can be effected by a micrometer 37 interconnected between the slide 33 and the torch bracket 32.

The torch can also be adjusted vertically to dispose its downwardy facing tip 38 in cutting proximity to a work piece in which teeth are to be flame cut, as by turning a knob 39 on the torch holder 40 in one direction or the other.

It is a feature of this invention that the particular mounting of the torch at a location forwardly remote from the rollers 25-26 and their tracks, with its cutting tip 38 a distance below the top of the supporting structure, assures against fouling thereof by molten metal spattering from the flame cutting zone, and more especially since the cutting tip 38 of the torch is always disposed at a level beneath the top of the supporting structure.

The rear portion of the carriage 10 has an elongated slot 42 therein, that extends forwardly a distance into the bottom 30 of the slideway 28. This slot accommodates a cam shaft 43 that is supported from the main frame and extends upwardly through and beyond the mounting plate 18 to mount a pair of cams 44 and 45 in spaced superimposed relation to one another and to the top of the carriage. Both cams are detachably fixed to the camshaft in any suitable manner to rotate therewith.

The upper cam 44 is a speed control cam that may have one or a pair of diametrically opposite lobes 46, depending upon the shape of the teeth to be cut in a work piece or blank, while the lower cam 45 can be termed a contour cam that determines the shape of the teeth to be flame cut in the blank. The contour cam is unique in that it has a cam track 47 in its underside, comprised of axially spaced cam surfaces between which a cam follower 48 is engaged, and which surfaces are so shaped as to effect flame cutting of one tooth in the blank in consequence of one complete revolution of the camshaft, as will be discussed at greater length hereinafter. Forming the cam track in the underside of the contour cam in this fashion has the advantage of effectively excluding dirt and foreign matter from the cam surfaces.

The follower 48 is engaged in the cam track at a location forwardly of the axis of the camshaft, and it comprises a roller that is freely rotatably mounted on the outer end of an arm 50 that extends lengthwise of the carriage and has its forward end connected therewith so that rotation of the cam is translated into reciprocatory motion of the carriage. The arm is connected to the carriage by means which allows the carriage to be moved backwardly or forwardly a limited distance relative to the arm and the cam, to provide for feed in movement of the carriage by which the torch can flame cut through edge portions of a blank that face either toward or away from the front of the carriage, to the desired cutting zone before automatic flame cutting is commenced.

For this purpose, the rear of the arm 50 is fixed to a slide block 51 which is positioned between and has tongue and groove connections with opposite guide rails 52 secured to the bottom 30 of the recess defining the slideway 28. The rails are mounted in the rear of this recess, at opposite sides thereof, and as shown, have horizontal grooves 53 therein opening toward one another, in which tongues 54 on the opposite sides of the block 51 are slidably received to at all times maintain the arm 50 in longitudinal alignment with the carriage.

During automatic operation of the machine, the carriage 10 is latched to the arm 50 and its slide block 51, so as to move back and forth with the arm as the cam 45 presents different surfaces of its cam track to the follower 48 on the rear of the arm. For this purpose, a feed in lever 56 is pivotally mounted on an upright post 57 fixed to and projecting up from the carriage at a location laterally adjacent to one of the guide rails 52.

One leg 58 of the lever extends transversely from the post and has its outer end directly over the front of the slide block 51, ahead of a stud 59 that is fixed to and projects upwardly from the block. A short link 60 having its rear end pivotally mounted on the stud 59 and its front end pivotally connected to the outer end of the leg 58 of the lever, as at 61, provides for the transmission of back and forth feed-in motion to the carriage 10 in consequence of swinging of the lever 56 in opposite directions about the axis of the post 57, at times when the carriage is released from the arm 50. Such swinging motion can be manually imparted to the lever by means of a handle 63 fixed to another leg 64 of the lever, that extends forwardly from the post 57.

The carriage is releasably latched to the arm 50 by a detent mechanism 65 of conventional construction, which comprises a cartridge 66 mounted in the forward or outer end of the leg 64 of the lever, and containing a detent member in the form of a ball 67 that projects from the underside of the leg 64 and is normally engaged under yielding bias in a depression 68 in the top of a pad 69 attached to the carriage. The biasing force on the detent ball is provided by a spring 70 in the cartridge 66, which is sufficiently strong as to normally maintain the detent mechanism in an operative condition latching the carriage to the follower arm 50, but easily permits release of the detent by force applied manually to the handle 63 to swing the lever 56 in one direction or the other about its pivot.

Figure 6:
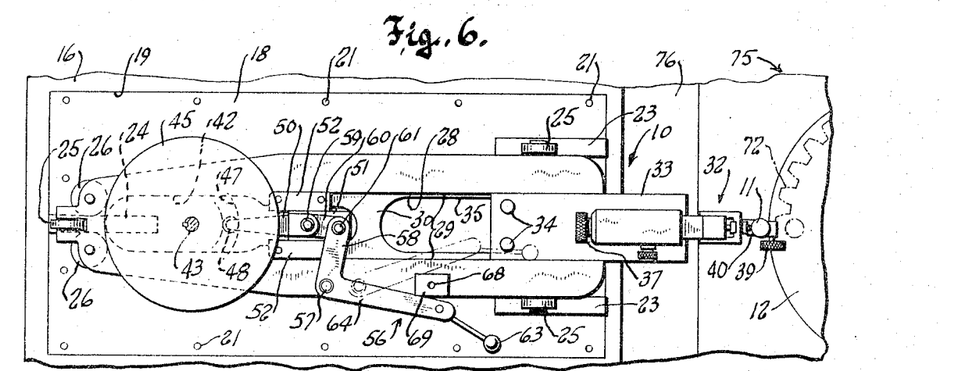
FIGURES 6 and 7 are similar fragmentary plan views illustrating the operation of the carriage feed-in mechanism.
Figure 7:
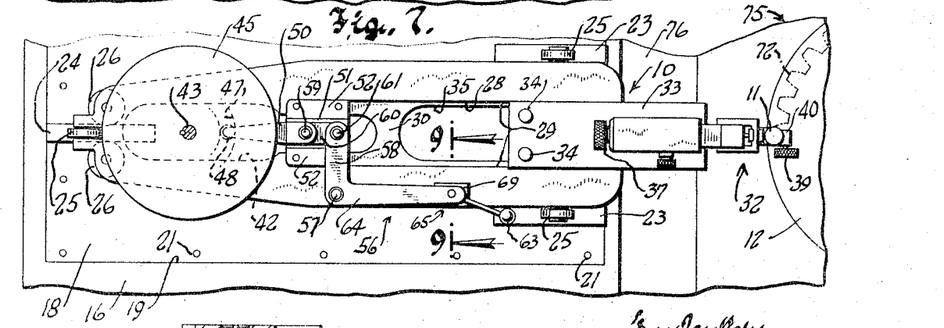

FIGURES 6 and 7 demonstrate how the flame of the torch can be fed through the peripheral edge portion of a circular work piece or blank 12 to the zone at which external gear teeth 72 (shown in broken lines) are to be automatically cut. In these views, FIGURE 7 illustrates the torch carriage in a position at which automatic flame cutting can begin, wherein the cutting tip 38 of the torch is directly over a circle having a diameter corresponding to that of the tips of the gear teeth 72.

The contour cam is then in a position such that the cam follower 48 is engaged with the "low" portion of the cam track, and the carriage is latched to the follower arm 50. FIGURE 6, however, shows that this cutting position was reached by first swinging the feed in lever 56 clockwise about its axis an extent great enough to retract the carriage and the torch thereon relative to the "anchored" arm 50, the distance necessary to position the cutting tip 38 of the torch outside the rear edge of the work piece or blank 12. When the torch is then lighted, the feed in lever may be slowly swung in the counterclockwise direction to produce forward motion of the carriage relative to the "anchored" follower arm 50, to thus advance the flame of the torch through the edge portion of the blank. After the lever has been returned to its normal position seen in FIGURE 7, at which the carriage is latched to the arm 50 by the detent mechanism, the actual gear cutting operation can be started.

FIGURE 6 also indicates, by the dotted line position of the leg 64 of the feed in lever, how rearward feed in motion of the torch may be effected, as when internal teeth are to be cut in the inner edge portion of an annular blank (not shown) connected to the work spindle by a suitable fixture (not shown).

The flame cutting of gear teeth in a blank or work piece involves turning of the blank in synchronization with reciprocation of the torch carriage in consequence of rotation of the contour cam 45. A rotatable upright work spindle 74 or arbor is provided for this purpose. The spindle is mounted in a housing-like bearing structure 75 located ahead of the main frame 13 of the machine and connected with the front of the main frame by a joining frame 76 in the nature of a hollow enclosure extending rearwardly from the bearing structure 75. Bolts 77 detachably connect the enclosure 76 with the main frame, for a purpose to be discussed hereinafter, and preferably rigidly hold the spindle 74 centered with respect to the carriage 10, so that the torch 11 moves in a path that intersects the spindle axis.

A collar 74′ on the upper end portion of the spindle 74 serves to locate the blank 12 at a location spaced a distance below the top of the supporting structure.

Rotation is imparted to the spindle 74 through a worm 78 that meshes with a worm wheel 79 fixed to the lower end portion of the spindle. The worm is secured to the forward end portion of an elongated spindle drive shaft, generally designated 80, which extends rearwardly from the bearing structure 75 through the enclosure 76 and into the interior of the main frame 13 where it is operatively connected with drive instrumentalities 81 now about to be described.

The drive instrumentalities comprise a power unit 82 supported on a bracket 83 that is secured to one of the side walls 14 of the main frame enclosure, at the interior thereof, laterally opposite the cam shaft 43. This power unit consists of a variable speed transmission 84 of the Graham type, and an electric motor 85 to drive the same. The variable speed transmission 84 is located behind the motor, and its output shaft 86 extends horizontally rearwardly therefrom and has a drive pulley 87 fixed thereto.

As is usual, the transmission also has a speed adjusting shaft 88, which in this case extends upwardly therefrom through the top of the supporting frame 13, and which is rotatably supported in tubular bearing 89 secured to the top of the frame. The upper end of the speed adjusting shaft projects from the top of the bearing and has a speed adjusting arm 90 secured thereto, so that the output speed of the transmission can be increased and decreased by swinging the speed adjusting arm 90 back and forth.

The drive instrumentalities also comprise a bearing structure 92 which is constructed so as to enable it to be secured by cap screws 93 to the underside of the carriage mounting plate 18 to form a subassembly therewith; and it has a size and shape to enable it to easily pass through the opening 19 in the top of the supporting structure during attachment of the subassembly thereto.

The bearing structure 92 preferably comprises fabricated upper and lower housing sections 94 and 95, respectively. The upper housing section 94 has an upright central portion 96 provided by a length of tubing, a number of ribs 97 joined to and radiating outwardly from said central portion, and horizontal flanges 98 and 99 secured to its top and bottom, respectively. The cap screws 93 pass upwardly through the top flange 98 and thread into the mounting plate 18 from its underside to hold the flange tightly thereagainst.

The bottom housing section 95 is somewhat pan shaped, and has a flange 100 around its top which abuts the underside of the bottom flange 99 on the upper housing section, to which it is secured by cap screws 101.

The cam shaft 43 is journaled in the tubular central portion 96 of the upper housing section 94, and it extends downwardly therethrough to have its lower end disposed inside the lower housing section 95, where a worm wheel 103 is secured to it. The worm wheel is driven by a worm 104 which is fixed on a worm shaft 105 journaled in suitable bearings in the lower housing section for rotation on a horizontal axis parallel to the axis of the output shaft 86 of the variable speed transmission. The rear of the worm shaft projects from the back of the lower housing section and has a pulley 106 secured thereto, so as to enable it to be drivingly connected to the output shaft of the variable speed transmission by a V-belt 107 trained about the pulleys 87 and 106.

An idler pulley 109 freely rotatably mounted on the outer end of an arm 110, is engaged with the outer stretch of the belt to hold the same tensioned and in good driving engagement with the pulleys around which it travels. The idler arm 110 is secured to the bracket 83 that supports the power unit, as by screws 111 that pass through slots in the arm so as to enable the idler pulley to be adjusted for proper tension on the belt.

The rear end portion of the spindle drive shaft 80 is rotatably supported in a bearing 113 carried by the lower housing section 95. This bearing is located below and to one side of the worm drive shaft 105, and the spindle drive shaft extends entirely through it to have a gear 115 detachably secured to its projecting rear portion. The spindle drive gear 115 is one of a set of so called change gears that further comprise a detachable gear 116 on the rear of the worm drive shaft, and one or more idler gears 117 drivingly interposed between the gears 115 and 116. Hence, the spindle drive shaft 80 can be driven at different speeds determined by the sizes of the gears 115, 116 and 117. Changeable gearing of this nature is essential for the cutting of different numbers of teeth in the work piece.

The idler gear (or gears) 117 is freely rotatably but detachably mounted on an idler arm 119 that has its hub swingably supported on the worm shaft 105 and interposed between the pulley 106 and the gear 116 thereon. The outer end of the idler arm 119 is pivotally connected to the lower end of a lock arm 120, which has its upper end adjustably connected to the bracket 83 as by means of a lock screw 121 passing through an elongated slot in the arm and threading into the bracket. It will be appreciated, of course, that in most instances when the gears are changed, some adjustment of the angular position of the idler arm will be necessary, to assure proper meshing of the idler gear (or gears) 117 with its companion gears on the worm and spindle drive shafts. After such adjustment is made, the lock screw 121 is tightened to hold the idler gears in meshing engagement with its companion gears.

Figure 1:
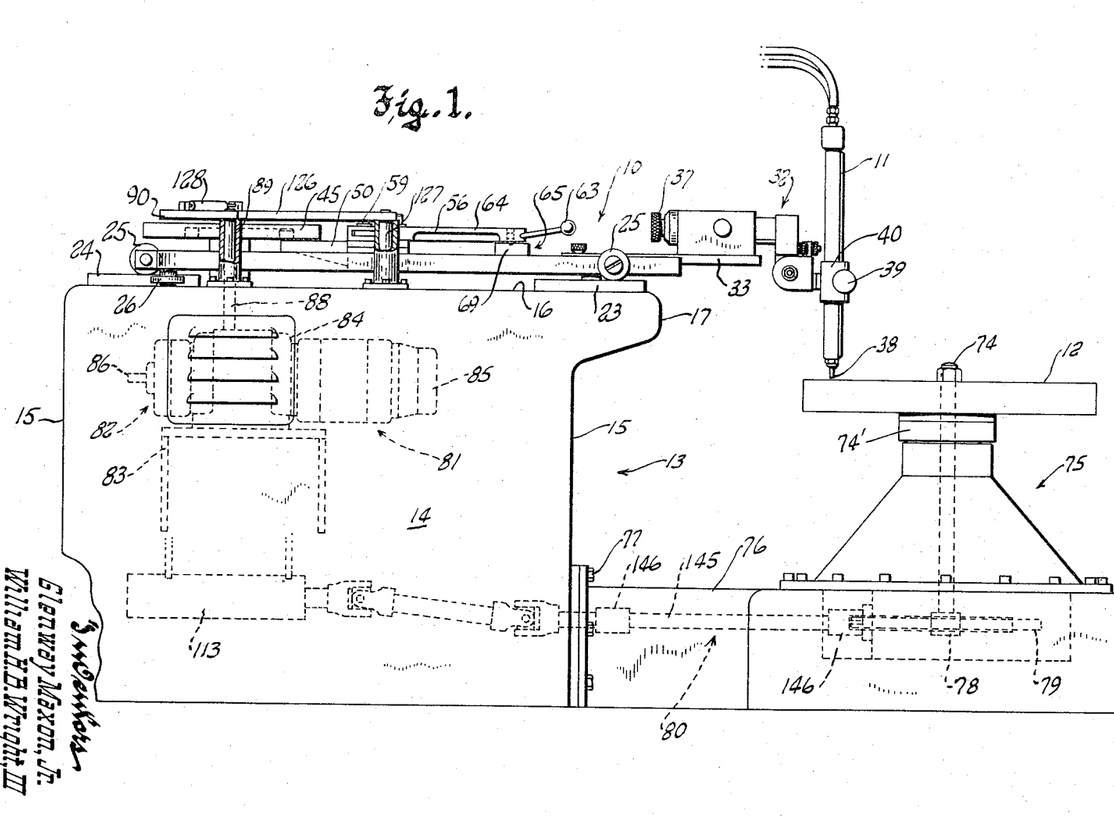
FIGURE 1 is a side elevational view of a flame cutting machine embodying the principles of this invention.
Figure 1A:
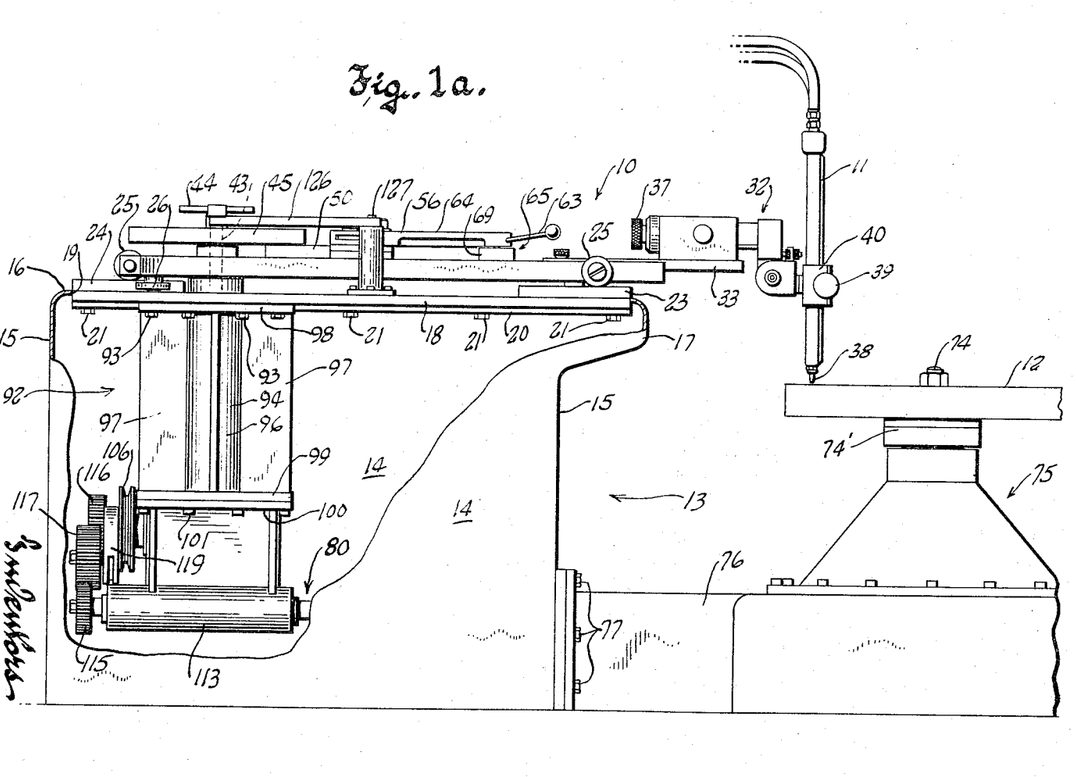
FIGURE 1a is a side elevational view similar to FIGURE 1, but having part of the main frame or supporting structure broken away to illustrate structure that is enclosed within it.
Figure 2:
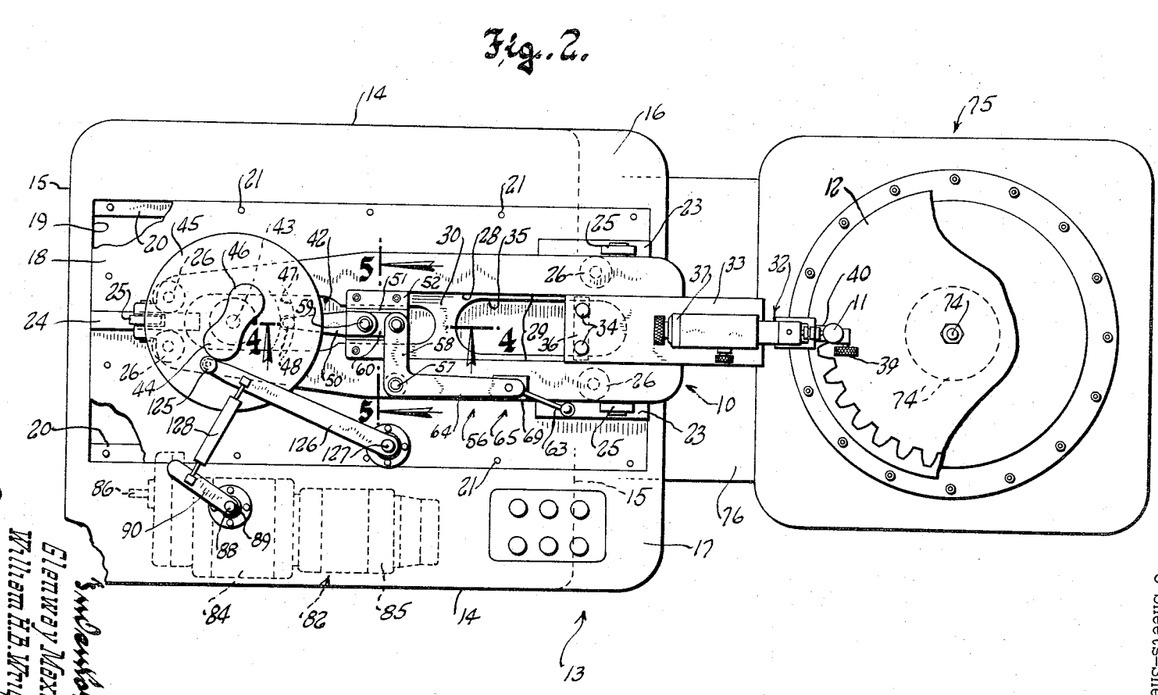
FIGURE 2 is a plan view of the machine.
Figure 3:
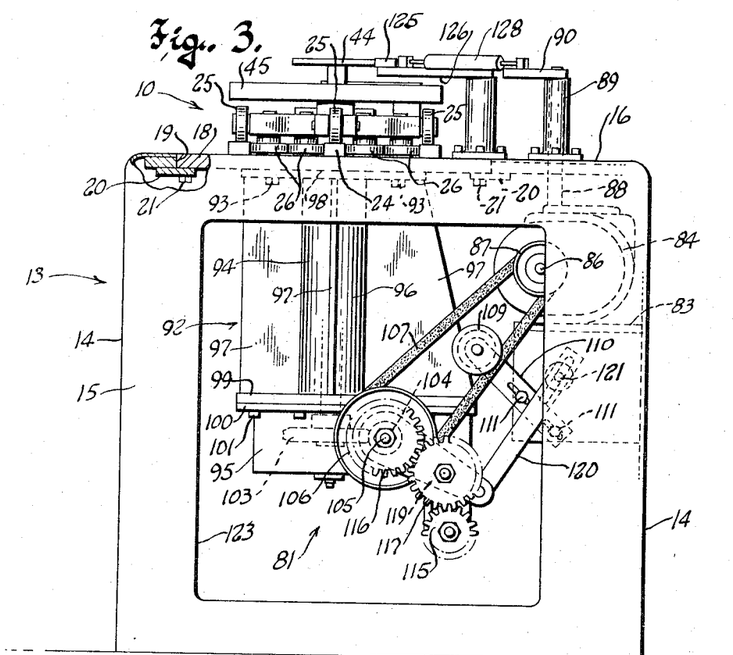
FIGURE 3 is a rear elevational view of the machine.
Figure 4:
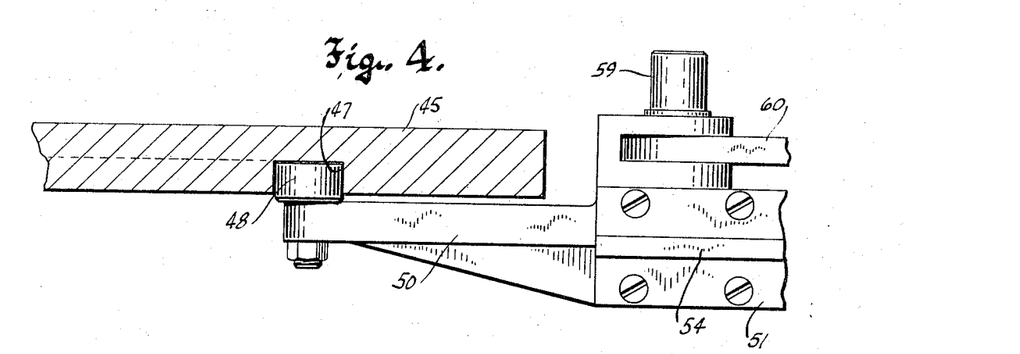
FIGURE 4 is an enlarged detail sectional view of a portion of the contour cam and its follower, taken on the plane of the line 4—4 in FIGURE 2.
Figure 5:
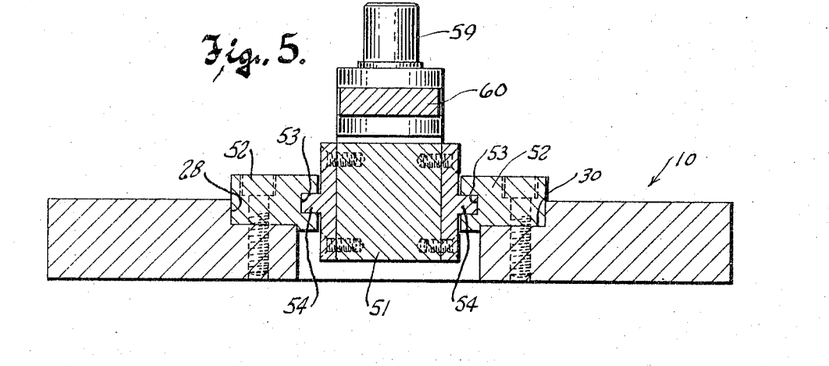
FIGURE 5 is a detail sectional view on an enlarged scale, taken on the plane of the line 5—5 in FIGURE 2.

As seen best in FIGURE 3, a large opening 123 is provided in the upright rear wall 15 of the supporting frame so as to provide ready access to the change gears. This opening, of course, may be closed by a detachable cover (not shown) if desired.

From the description thus far, it will be apparent that during automatic operation of the machine, the work piece or blank 12 will be slowly rotated by its spindle 74 while the torch 11 travels back and forth with the carriage 10 in consequence of rotation of the cam 45 on the camshaft 43. The contour cam 45 has a cam track of a shape that determines the profile of the teeth cut in the blank and may thus cause the torch to be held stationary while the blank rotates when the roots and tips of gear teeth are being flame cut. During flame cutting of the flanks of the teeth, however, the torch is moved fore and aft during rotation of the blank. Hence, in order to assure flame cutting of teeth with accurately smooth profiles, the lineal speed of torch motion relative to the surface of the blank must be as uniform as possible. To this end, the output speed of the transmission 84 must be periodically adjusted so as to cause the work spindle to rotate faster at times when the torch is at the limits of cam produced reciprocatory motion and the roots and tips of gear teeth are being cut in the blank, and to cause the spindle and contour cam to rotate more slowly between the limits of torch motion while the flanks of the teeth are being cut by the flame of the torch.

Such periodic adjustment of the output speed of the transmission 84 is effected by swinging the speed control arm 90 back and forth in synchronization with rotation of the contour cam 45. The speed control cam 44 is provided for that purpose. This cam is mounted on the top of the cam shaft to rotate in unison with the contour cam, and it is so shaped and located angularly with respect to the cam track on the contour cam as to effect alternate acceleration and deceleration of the output speed of the transmission at the desired times during the flame cutting operation. Hence, the speed control cam causes a decrease in speed when the slope cut on the blank approaches the radial, and causes the speed to increase to a maximum when the cut is circumferential.

A follower 125 freely rotatably mounted on the outer end of an arm 126 tracks on the periphery of the speed control cam and effects swinging motion of the arm 126 about its pivotal mounting 127 on the top of the supporting structure as the cam rotates. Such swinging motion of the arm 126 is transmited to the speed change arm 90 of the transmission through a turnbuckle 128 connecting said arms. The turnbuckle provides for adjustment of the angular relationship of the speed control arm relative to that of its cam 44, thereby making it possible to raise or lower the output speed of the transmission relative to the speed control cam to compensate for different thicknesses in the work piece being flame cut.

Figure 8:
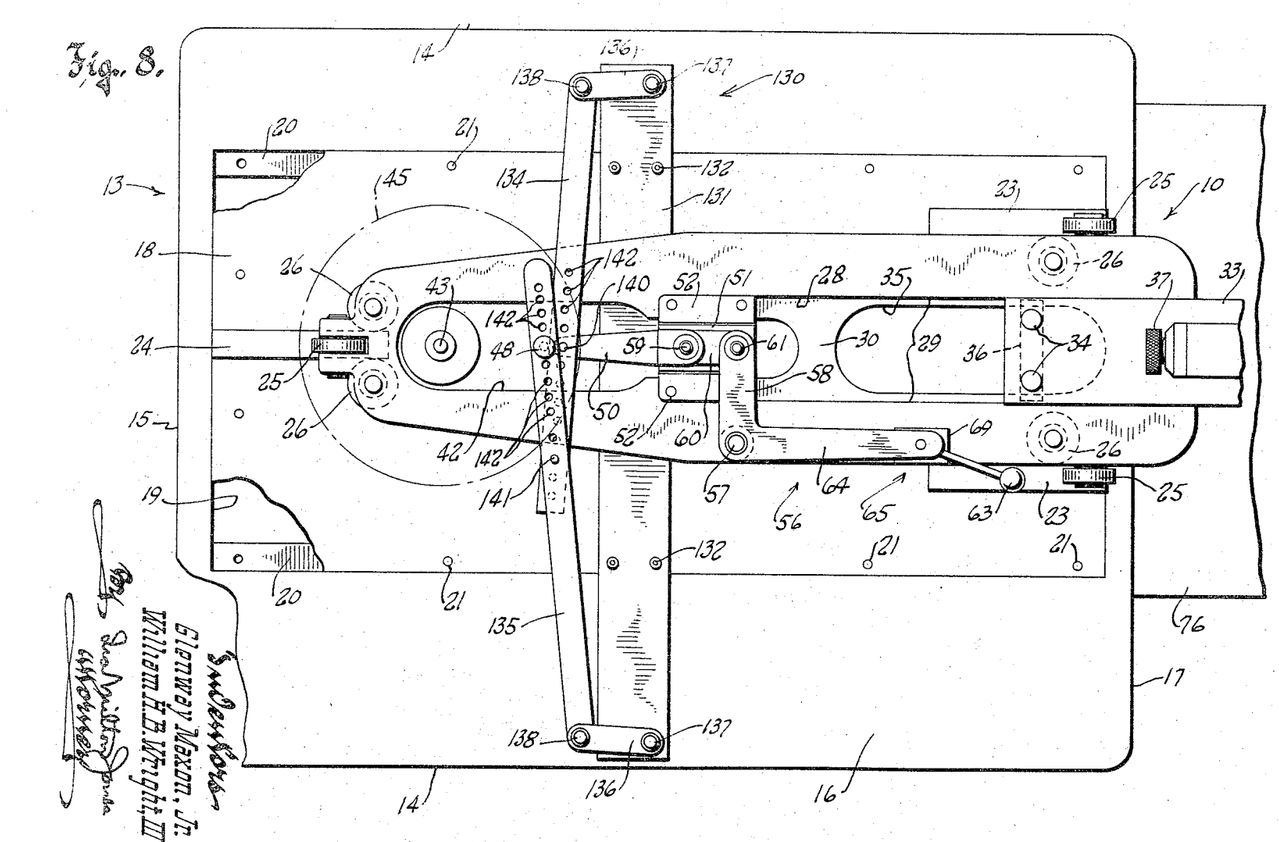
FIGURE 8 is an enlarged fragmentary plan view of the machine when equipped with a pantograph attachment that is connected between the contour cam and the torch carriage, and which can be adjusted to either increase or decrease the extent of carriage reciprocation with any given contour cam, to correspondingly produce larger or smaller teeth.
Figure 9:
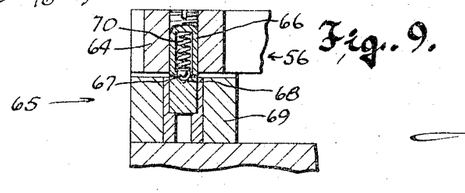
FIGURE 9 is an enlarged detail sectional view taken on the plane of the line 9—9 in FIGURE 7, illustrating a detent type latch for the feed-in mechanism shown in FIGURES 6 and 7.

With the apparatus described, different cams 45 and matching speed control cams 44 are required for cutting teeth of different sizes. These cams are readily interchangeable and they can be clearly marked as matching pairs so as to enable the cams for teeth of different sizes to be substituted at will, without the attention of a highly skilled operator. If desired, however, rotation of the contour cam 45 can be translated into reciprocatory motion of the carriage 10 and the torch thereon through pantograph linkage 130 such as seen in FIGURE 8, so as to enable the same contour cam to be used for the flame cutting of gear teeth either larger or smaller than would be produced by the cam alone.

The pantograph linkage is in the nature of an accessory that can be readily mounted on the top of the supporting structure or frame 13 without disturbing any of the mechanism thereon, other than to remove the follower 48 from the arm 50. It comprises an elongated bar 131 that extends transversely across the top of the supporting structure, under the carriage 10, and just ahead of the contour cam 45. Screws 132 in the bar, threaded into the mounting plate 18 near each side edge thereof, readily detachably secure the bar in place on the top of the supporting structure.

The linkage of the pantograph comprises a pair of elongated links 134 and 135 which extend substantially transversely over the carriage 10 but under the forward portion of the cam 45, and a pair of short links 136 at the opposite ends of the bar 131, extending substantially lengthwise of the carriage. The forward end of each of the short links 136 is pivotally supported on an upright stud 137 fixed in the adjacent end of the bar 131, and its rear end is pivotally connected as at 138 with the outer end of one of the long links 134. The pivotal connections 138 are such as to disposed the long link 135 slightly above the level of the other long link 134, thus allowing the inner ends of the long links to cross one another under the contour cam 45.

The cam follower 48, in this case, is carried by the long upper link 135. It is mounted on the link in a position which, as will appear shortly, is controlled to follow along a line joining the torch and the axis of the contour cam, namely the longitudinal centerline of the carriage. The follower arm 50, is detachably connected to the lower link 134 by a pin 140. A pin 141 connects the two long links to complete the pantograph. This pin can be engaged in different pairs of holes 142 accurately drilled in the long links to enable adjustment of the distance the carriage will be moved in consequence of rotation of the contour cam 45. This adjustment enables the distance of carriage travel to be either less than the throw of the contour cam, as is the case with the pin 141 located at the side of the follower 48 shown in FIGURE 8, or greater than the throw of the cam when the pin is in holes in the links at the opposite side of the cam follower.

The spatial relationship of the matching holes 142 in the links can be such as to provide for cutting a great number of teeth of different sizes without distortion due to the angularity of the long links. For example, the pin 141, when engaged in any pair of matching holes 142, will be equidistant from the follower 48 and from the pin 140 that connects the arm 134 with the carriage; and if the two links 134 and 135 are approximately at equal but opposite angles to the longitudinal centerline of the carriage (passing through follower 48 and pin 140) then follower 48 must travel along said centerline as the cam rotates. The short links 136, of course, allow the long links to move lengthwise back and forth to assure such straight line travel of the follower 48. This, of course, assures that all of the motion imparted to the follower 48 by the contour cam will be transferred to the torch, without danger of losing some of this cam produced motion due to the swinging motion of the long links of the pantograph in use.

The flame cutting apparatus described is capable of flame machining toothed objects such as gears and sprockets of a wide variety of diameters. In this respect, the slide 33 which connects the torch to the carriage, provides for considerable adjustment of the position of the torch relative to the work spindle 74. According to this invention, gears and sprockets of very large diameters can be flame cut when the bearing structure 75 for the work spindle 74 is detached from the main frame or supporting structure 13, and anchored at a suitable location farther from the front of the latter. While the bolts 77 provide for such shifting of the work spindle for the accommodation of larger work pieces or blanks, the spindle drive shaft 80 is also constructed to enable it to be extended to the new location of the work spindle.

For this purpose, the spindle drive shaft comprises a readily replaceable shaft section 145, which can be square or hexagonal in cross section if desired, and correspondingly shaped sockets 146 in which the ends of the shaft section 145 are received. The sockets 146 may be located on the spindle drive shaft as to dispose the shaft section 145 either partly inside the enclosure provided by the supporting structure 13, or to dispose it normally within the joining frame 76, as shown. Suitable set screws, not shown, may be threaded through the walls of the sockets 146 to bear against the shaft section therein and thus prevent all rotary movement of the shaft section relative to the sockets.

From the foregoing description, together with the accompanying drawings, it will be readily apparent to those skilled in the art that the flame cutting apparatus of this invention features simplicity of construction at relatively low cost, along with an unusual degree of versatility which results from the provision of pantograph linkage in the form of an accessory that is readily attachable to the apparatus; and of an exceptionally stable and non-fouling carriage along with handy feed in mechanism therefor contribute to accurate flame cutting and ease of operation.

What is claimed as our invention:

1. A flame cutting machine of the type having a rotatable power driven cam drivingly connected with an elongated carriage by a latch means to effect lengthwise fore and aft reciprocation of the carriage along the top of a carriage supporting structure to enable the flame of a cutting torch on the carriage to cut through a work piece that is carried by a spindle which rotates the work piece about an upright axis, said flames cutting machine having the following characteristics:
   (A) that the front end portion of the carriage projects a distance beyond the supporting structure;
   (B) that torch supporting means mounts the torch on said projecting front portion of the carriage, with its cutting tip lowermost and at a level beneath the top of the supporting structure and at a distance beyond the front end portion of the carriage;
   (C) that the carriage is constrained to lengthwise fore and aft reciprocatory motion by cooperating guide means on the carriage and its supporting structure positioned both fore and aft of the axis of rotation of said rotatable cam, and all portions of which guide means are located above and a substantial distance rearwardly of the cutting tip of the torch so as to be remote from the zone at which flame cutting takes place;
   (D) and that the latch means normally maintains the carriage drivingly connected with the cam but is releasable to provide for lengthwise movement of the carriage relative to the cam axis.

2. In a flame cutting machine of the type having an elongated carriage constrained to lengthwise fore and aft motion along a straight path, over the top of a supporting structure therefor, to carry a torch on the front of the carriage across a moving work piece being cut by the flame of the torch, means for imparting fore and aft motion to the carriage, comprising:
   (A) a power driven cam mounted on the supporting structure for rotation about a vertical axis with a portion of the cam spaced above the rear portion of the carriage, said cam having a cam track which is
      (1) closed at the top of the cam,
      (2) open at the underside of the cam,
      (3) and comprised of radially spaced cam surfaces;
   (B) a cam follower engaged in said cam track;
   (C) an arm connecting the cam follower with the carriage, said arm extending fore and aft of the carriage and having its rear portion projecting under the cam toward the cam follower;
   (D) and pantograph linkage pivotally mounted on the supporting structure at its top, comprising a pair of elongated pivotally connected links extending transversely over the rear portion of the carriage and under said portion of the cam, from opposite sides of the carriage, the cam follower being mounted on one of said links and the other being connected with said arm.

3. A flame cutting machine of the type having a rotatable power driven cam drivingly connectced with an elongated carriage to effect lengthwise fore and aft motion of the carriage along the top of a supporting structure to enable the flame of a torch on the carriage to cut through a movable work piece, said flame cutting machine being further characterized by the following:
   (A) the carriage has a slot therein intermediate its ends;
   (B) the cam is mounted at an elevation above the carriage, on the upper end portion of a cam-shaft that is carried by the supporting structure and extends upwardly from its top and through said slot in the carriage;
   (C) the torch is mounted on one end portion of the carriage;
   (D) the carriage is constrained to reciprocatory motion by cooperating guide means on the carriage and its supporting structure, said cooperating guide means including carriage supporting elements at the end portion of the carriage remote from the torch and a distance rearwardly of the camshaft;
   (E) pantograph mechanism through which the cam imparts motion to the carriage, said mechanism including a pair of elongated articulated links, one of which is connected with the carriage and the other of which is acted upon by the cam;
   (F) and means mounting each link on the top of the supporting structure with said links thereof extending crosswise over an intermediate portion of the carriage but ahead of the cam.

4. In a flame cutting machine of the type having a carriage constrained to fore and aft reciprocatory motion along a straight path, over the top of a supporting structure therefor, to carry a cutting torch mounted thereon across a moving work piece being cut by the flame of the torch, means for imparting fore and aft motion to the carriage, comprising:
   (A) a power driven cam carried by the supporting structure, at its top, and adjacent to a portion of the carriage;
   (B) pantograph linkage pivotally carried by the supporting structure and comprising a pair of elongated links which extend transversely across the path of carriage motion, said links having inner end portions which are adjacent to said portion of the carriage and to one another, and being pivotally supported by their outer ends at zones lying at opposite sides of the carriage and directly opposite one another;
   (C) means pivotally connecting one of said links to the carriage;
   (D) a cam follower mounted on the other link and engaging said cam;
   (E) and means providing for directly pivotally connecting the inner end portions of the links at points spaced lengthwise of the links to one side or the other of the cam follower.

5. In a flame cutting machine of the type having a carriage constrained to back and forth motion along the top of a supporting structure to carry a cutting torch mounted on the carriage across a work piece being cut by the flame of the torch, means for imparting motion to the carriage, comprising:
   (A) a power driven cam carried by the supporting structure adjacent to a portion of the carriage, and having a cam track thereon;
   (B) follower means operatively engaged with said cam track and movable relative to the cam axis only as a consequence of rotation of the cam;
   (C) means connecting said follower means with the carriage for back and forth movement of the carriage relative to the follower means;
   (D) and latch means releasably connecting the carriage with the follower means to prevent movement of the carriage relative to said follower means and providing for relative movement of said carriage with respect to said follower means when said latch means is released.

6. The flame cutting machine of claim 5, wherein said connecting means comprises:
   (A) an arm having the follower means mounted on one end thereof, and extending lengthwise in the direction of back and forth movement of the carriage;
   (B) structure on the carriage defining guide rails that extend lengthwise of the carriage;
   (C) means on the other end of the arm slidingly interengaging with said guide rails;
   (D) and a lever pivotally mounted on the carriage and connecting with said other end of the arm, so that swinging of the lever in opposite directions about its pivot effects back and forth movement of the carriage when said latch is released.

7. The flame cutting machine of claim 5, wherein back and forth motion is transmitted to the carriage from the follower means through adjustable pantograph linkage pivotally carried by the supporting structure at its top.

8. The flame cutting machine of claim 6, wherein said releasable latch comprises cooperating detent means on the hand lever and the carriage.

9. In a flame cutting machine of the type having an elongated carriage constrained to lengthwise fore and aft motion along a straight path, over the top of a supporting structure therefor, to carry a cutting torch mounted on the carriage across a moving work piece being cut by the flame of the torch, means for imparting fore and aft motion to the carriage, comprising:
   (A) a power driven cam carried by the supporting structure at its top, above a rear portion of the carriage;
   (B) an arm rigidly connected at one end with the carriage and extending rearwardly therefrom toward the cam;
   (C) a cam follower operatively engaged with the cam at a location adjacent to the rear end of said arm;
   (D) pantograph linkage comprising
      (1) a pair of short links located at opposite sides of the carriage and extending substantially parallel to the path of carriage motion,
      (2) means pivotally connecting the forward ends of said short links to the top of the supporting structure,
      (3) and a pair of long links each having an outer end pivotally connected to the rear end of one of said short links, said long links extending transversely inwardly over the carriage and having their inner end portions pivotally connected together;
   (E) means mounting said cam follower on the inner end portion of one of said long links;
   (F) and means connecting the rear end of said arm to the inner end portion of said other long link.

10. The flame cutting machine of claim 9, wherein said one end of the arm is connected to the carriage by means which comprises:
   (A) means on the carriage defining guide tracks with which said one end of the arm is engaged, and which provides for back and forth motion of the carriage relative to the arm;
   (B) a lever pivotally mounted on the carriage and connected with the arm to effect limited back and forth motion of the carriage in consequence of manual swinging of the lever about its pivot;
   (C) and releasable latch means normally holding the lever against swinging motion so as to thereby prevent back and forth motion of the carriage relative to said arm except when said latch means is released.

11. A flame cutting machine of the type having a rotatable power driven cam drivingly connected with an elongated carriage to effect lengthwise fore and aft motion of the carriage along the top of a supporting structure to enable the flame of a torch on the carriage to cut through a movable work piece, said flame cutting machine being further characterized by the following:
   (A) the carriage has a slot therein adjacent to one end;
   (B) the cam is mounted at an elevation above the carriage, on the upper end portion of a cam-shaft that is carried by the supporting structure and extends upwardly from its top and through said slot in the carriage;
   (C) the torch is mounted on the opposite end of the carriage so as to be as distinct as possible from the cam;
   (D) and the carriage is constrained to reciprocatory motion by cooperating guide means on the carriage and its supporting structure all located a distance behind the torch, said cooperating guide means including carriage supporting elements at the end portion of the carriage remote from the torch and a distance rearwardly of the camshaft.

References Cited by the Examiner
UNITED STATES PATENTS

| | | | |
|---|---|---|---|
| 1,362,700 | 12/1920 | Huffman | 74—55 |
| 2,432,161 | 12/1947 | Johnston | 266—23 |
| 2,540,125 | 2/1951 | Kolks | 74—55 |
| 2,583,002 | 1/1952 | Maxon | 266—23 |

JOHN F. CAMPBELL, *Primary Examiner.*

M. L. FAIGUS, *Assistant Examiner.*